INVENTORS
RICHARD H. FULLER
JU C. TU
RICHARD M. BIRD
BY [signature]
ATTORNEYS

LOGICAL CIRCUIT WITH TWO-DIMENSIONAL MAGNETIC CORE MATRIX

INVENTORS
RICHARD H. FULLER
JU C. TU
RICHARD M. BIRD
BY [signature]
ATTORNEYS

INVENTORS
RICHARD H. FULLER
JU C. TU
RICHARD M. BIRD
BY [signature]
ATTORNEYS

United States Patent Office 3,444,533
Patented May 13, 1969

3,444,533

LOGICAL CIRCUIT WITH TWO-DIMENSIONAL MAGNETIC CORE MATRIX

Ju C. Tu, Sylmar, Richard H. Fuller, Sherman Oaks, and Richard M. Bird, Glendale, Calif., assignors to Singer-General Precision, Inc., a corporation of Delaware Filed May 4, 1965, Ser. No. 452,982
Int. Cl. G11b 5/00; G06f 7/02
U.S. Cl. 340—174 6 Claims

ABSTRACT OF THE DISCLOSURE

A two-dimensional matrix of magnetic cores, which are associated with data words stored in an associative memory is disclosed. A pair of cores are associated with each data word. The magnetic cores associated with data words which compare with a search word, in accordance with a selected comparison criterion, are driven to a first state of magnetic remanence, while the cores associated with the rest of the words are in a second state of magnetic remanence. The cores in the first state of magnetic remanence are then used to sequentially address the data words in memory which are associated with core-pairs in the first state of magnetic remanence.

This invention relates to computer circuitry and, more particularly, to a logic circuit utilizing magnetic cores.

Advanced computer technology has led to the development of computers with associative, or content addressable memories. In such a computer, the entire content of the data stored therein, such as a plurality of multibit words, can be simultaneously compared with an address or input word, in order to determine if and/or how many of the stored words match the input word. After comparing the content of the memory with the input word, namely, searching the memory, it is often desirable to sequentially read out all the words which match the particular word.

One simple way of reading out all the matched words is to address each word in the memory, determine whether it matches the input word and if it does, read it out. However, such an operation would be very time consuming and expensive if the number of words stored in the memory is quite large, which is usually the case. Circuits have therefore been developed to select, out of all the words stored in a memory, only those words which match the particular word and thereafter, sequentially address only the matched words, so that they could be read out. Prior art circuits, though operating quite satisfactorily, are very complex and expensive. The circuits usually require a large number of components which must be carefully interconnected, thus resulting in a relatively large and complex circuit which is difficult to maintain and/or service. Therefore, a need exists for a more simple circuit with which a plurality of words in a computer, which have been found to match a particular input word, can be sequentially addressed so that their content could be sequentially read out.

Accordingly, it is an object of the present invention to provide a novel circuit which is less complex than prior art circuitry performing similar functions.

Another object of the present invention is to provide a new and simple circuit for sequentially addressing a particular group of words out of a plurality of words stored in a computer memory, without having to address each of the stored words.

Still a further object of the present invention is to provide a two-dimensional priority circuit which is used to control the addressing of the words stored in the memory, so that only a select group of words, such as those matching a particular address word may be sequentially read out without the addressing of the mismatch words.

These and other objects are achieved by providing a circuit which incorporates a matrix of magnetic cores. Each core is of magnetic material which has two states of magnetic remanence to which the core can be driven by currents induced in windings threaded therethrough. A pair of cores are connected to each word stored in the memory. During the search operation, namely, when all the words stored in the memory are compared with an address word, all the stored words which do not meet a certain comparison criterion, such as matching the address word, drive the cores associated therewith to a first state of magnetic remanence. All the other cores coupled to the words which meet the comparison criterion (i.e. match the address word), remain in a second state of magnetic remanence, hereafter referred to as the match state.

The pairs of cores are arranged in a two-dimensional matrix of rows and columns to which are coupled registers and drivers. The cores in the match state of magnetic remanence are used to control the row and column registers which are in turn connected to additional logic and control circuitry. The latter mentioned circuitry is used to sequentially select and drive the pairs of cores associated with the matched words so that only the matched words in the memory are sequentially interrogated in order to read out the data contained therein. The magnetic cores can be inductively coupled to associated circuitry with a minimum of wiring complexity, so that the finished circuit is highly reliable and can be operated with a minimum of maintenance. Also the novel circuit of the present invention is considerably less expensive than comparable circuits which perform similar functions.

The novel features that are considered characteristic of this invention are set forth with particularity in the appended claims. The invention itself both as to its organization and method of operation, as well as additional objects and advantages thereof, will best be understood from the following description when red in connection with the accompanying drawings, in which:

Figure 1:
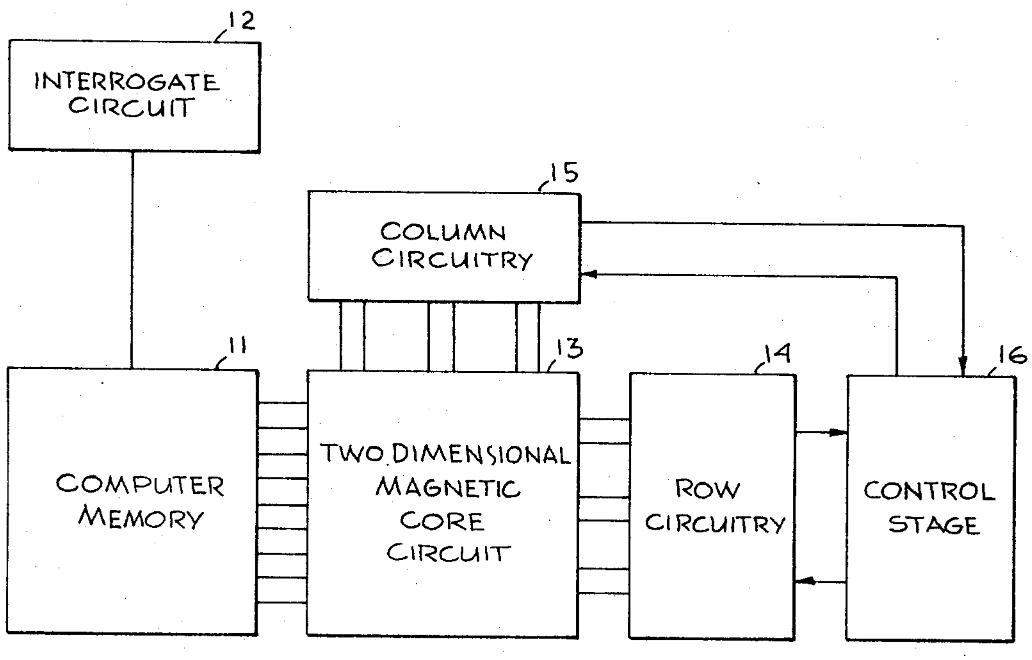
FIGURE 1 is a simplified block diagram of the circuit of the present invention in conjunction with a computer memory.

Reference is now made to FIGURE 1 which is a simplified block daigram useful in explaining the function of the novel circuit of the present invention. A computer memory 11 is shown connected to an interrogate circuit 12 and to a two-dimensional magnetic core circuit 13. It is assumed that the words are stored in an associative memory and are compared in parallel with a word in the interrogate circuit 12 so that each word from the computer memory provides the matrix 13 with a signal which indicates the comparison therebetween and the word in the circuit 12. Each word from the computer memory provides a pair of cores which are included in the circuit 13 with a signal which represents the comparison of the word with the address word in the interrogate circuitry. For explanatory purposes, let it be assumed that if the stored word does not match the address word, the two cores associated therewith, which are included in the circuit 13, are driven to a mismatch state of magnetic remanence, while all the cores associated with words which match the address word in circuit 12 are driven or remain in a match state of magnetic remanence.

Within the circuit 13, the pairs of cores are arranged in a matrix of rows and columns, each row of cores being connected to a row circuitry 14, while the cores in each column are connected to a column circuitry 15. The latter two circuits are interconnected with a control stage 16. Each of the circuits 14 and 15 comprises registers and drivers.

In operation, after the content of the memory 11 is interrogated or searched, by comparing the content thereof with the address word in the interrogate circuit 12, all the cores associated with the mismatched words are driven to their mismatch state of magnetic remanence, while all the cores in the circuit 13 associated with matched words are in the matched state of magnetic remanence. Thereafter, the control stage 16 controls circuits 14 and 15 in such a manner that the first row in which cores set in their matched state is detected. The cores in the first row are interrogated to determine the columns in which cores in the match states are included. Subsequently, the control stage 16 energizes the drivers included in the column circuitry 15, to sequentially actuate the cores in the first row which are associated with matched words in the computer. These cores sequentially energize the stored words in order to sequentially read out the information contained therein. After all the matched words in the computer memory 11 which are associated with cores in the first row have been read out, the row circuitry 14 detects a subsequent row which includes cores in their matched state of magnetic remanence, to subsequently read out the information contained in the words associated with such cores.

Figure 2:
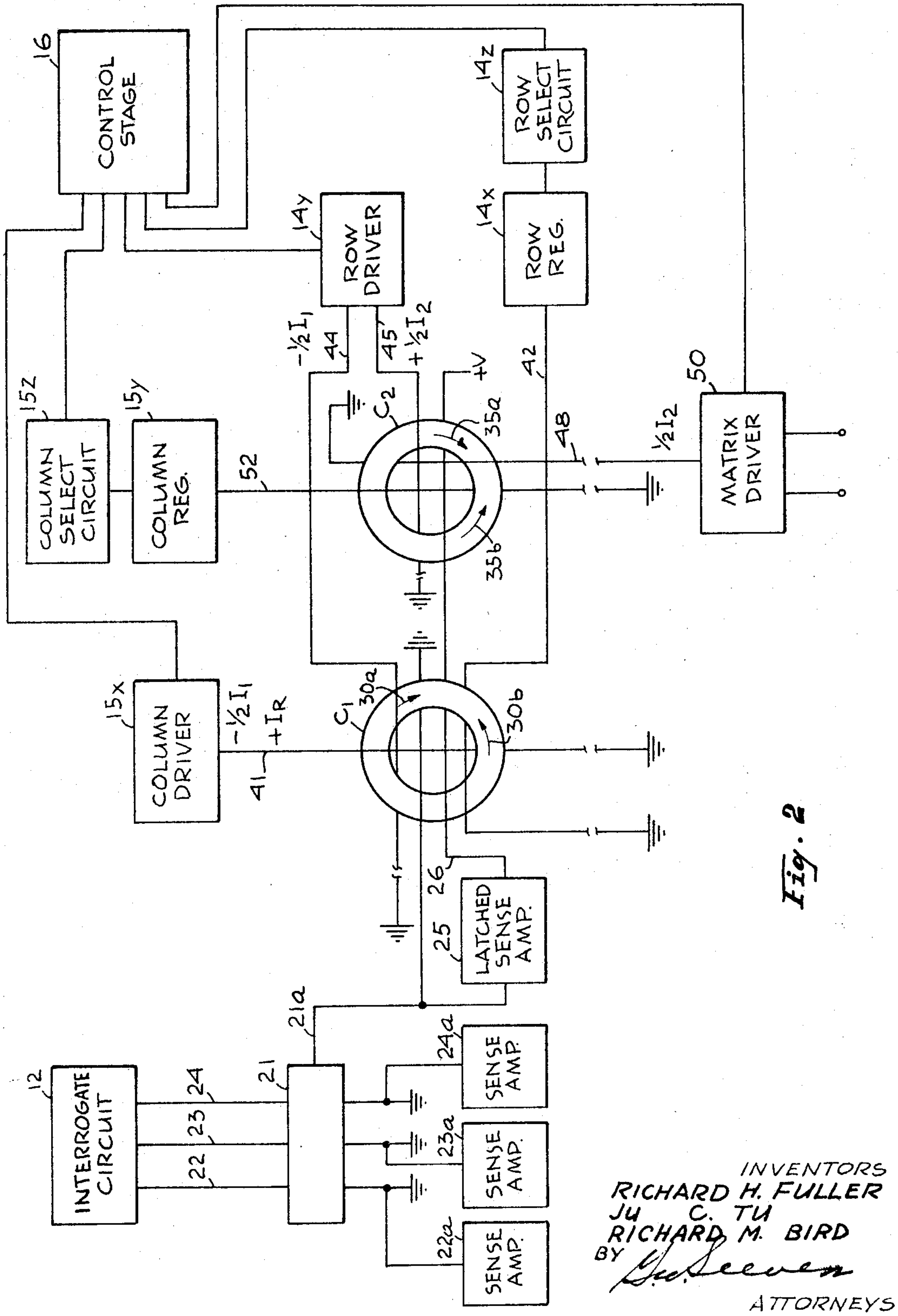
FIGURE 2 is a partial block diagram of the circuit shown in FIGURE 1, useful to explain the novel features of the invention.

For a better understanding of the teachings of the present invention, reference is now made to FIGURE 2 which is a partial diagram of the arrangement shown in FIGURE 1. Therein is shown a single memory word 21 which is assumed to store data in the computer memory 11. As is appreciated by those familiar with the art, the word may comprise a word line **21*a* plated with a thin-film of magnetic material to form a plated wire in which data, such as binary data, may be stored. As seen, the word 21 which is assumed to be one of a plurality of words in the computer arranged in a particular sequence, is coupled to the circuit 12 by a plurality of lines designated by numerals 22, 23 and 24. The function of these lines, which are equal in number to the number of bits of each word, is to interrogate the word by currents provided by circuit 12. The signal induced in line 21*a* is an indication of the comparison between word 21 and the input word in the circuit 12**.

The line **21*a* is shown connected to a sense amplifier 25 and a magnetic core $C_1$. The function of the amplifier, as will be explained hereinafter in detail, is to provide a signal as a function of the signal induced in line 21*a*. The sense amplifier 25 is coupled to the core $C_1$ and a second core $C_2$ by a winding 26 which is connected to a source of reference potential +V. Cores $C_1$ and $C_2$ and the sense amplifier 25 are included in the circuit 13 and form a unit therein which is associated with the word 21 in the computer memory 11**.

Let us assume that prior to interrogating the word 21 to compare it with the address word in the circuit 12, the cores $C_1$ and $C_2$ are in a matched state of magnetic remanence as indicated by clockwise directed arrows **30*a* and 35*a* respectively. Then, during the interrogate or search operation, if the word 21 does not match the address word in circuit 12, a signal is induced in line 21*a*. This causes the sense amplifier 25 to provide a signal or pulse in winding 26 so as to drive the cores $C_1$ and $C_2$ to a mismatch state of magnetic remanence, designated by counterclockwise directed arrows 30*b* and 35*b*. If however the word 21 matches the address word in circuitry 12, the sense amplifier does not induce an output signal on winding 26 so that cores $C_1$ and $C_2$ remain in their matched state of magnetic remanence (arrows 30*a* and 35*a***).

For explanatory purposes, let us assume that the word 21 matches the address word in the interrogate circuit 12, so that at the end of the interrogate or search operation, cores $C_1$ and $C_2$ are in their matched state. Thereafter, control stage 16 energizes a column driver **15*x* which forms a part of the column circuitry 15, herebefore described. The column driver is inductively coupled by a winding 41 to all the first cores of each pair of cores in one of the columns. The driver provides these cores with a signal which is sufficient to drive them to their mismatch state of magnetic remanence, but is insufficient to induce a current in line 21*a* which may upset or modify the data contained in word 21. By driving the first cores of each pair to their mismatch state of magnetic remanence, a current is induced in a winding 42 which couples all the first cores in a given row to a row register 14*x* which is connected to a row select circuit 14*z*. The latter two circuits, together with a row driver 14*y*, form a part of the row circuit 14, hereinbefore described. The row select circuit is connected to the control stage 16 which is in turn connected to the row driver 14*y*. The driver 14*y* is coupled by a first winding 44 to all the first cores, such as core $C_1$, of each pair of cores in its respective row, and by a second winding 45 to all the second cores (cores $C_2$) in the same row. In addition, the second core of each pair of cores in the row is coupled by means of a winding 48 to a matrix driver 50**.

After the row select circuit **14*z* energizes the control stage, indicating the first row in which is present a first pair of magnetic cores in their matched state of magnetic remanence, thereby indicating the first row including a word that matches the address word in the circuitry 12, control stage 16 energizes drivers 14*y* and 50 to supply currents in windings 45 and 48**, the currents being designated by $+\frac{1}{2} I_2$. The plus indicates that the currents are used to drive a core to the mismatch state of magnetic remanence, the subscript 2 indicates that the current is used to actuate the second core in each pair while, the ½ sign indicates that two coincident current are needed to actuate the core.

Thus, the currents from drivers **14*y* and 50 are coincidently supplied to the second magnetic core $C_2$ to switch or drive it to its mismatch state of magnetic remanence. As a result, a current or signal is induced in a winding 52 which connects all the second cores in a particular column to a column register 15*y* which forms a part of the column circuitry 15. The column register is connected to the control stage 16 through a column select circuit 15*z***.

After driving all the second cores of the pairs of cores associated with matched words in a given row to their mismatched state of magnetic remanence, all the column registers associated with such second cores are set or driven to their set state. The state of all the column registers is sensed by the column select circuit which in turn provides this information to the control stage 16. Thus, at this stage of operation, the control stage 16 is provided with information indicating the first row of cores associated with matched words as well as all the columns in which cores in the particular row are present which are associated with matched words. Thereafter, the control stage energizes the row driver **14*y* and column driver 15*x* to provide a current designated by $-\frac{1}{2} I_1$ in windings 44 and 41** respectively. The minus sign indicates that the current is used to switch a core to the matched state of magnetic remanence, the ½ indicates that the current must be coincident with another current to accomplish the switching and the subscript 1 designates that the currents are used to actuate the first core ($C_1$) of each pair of cores. Thus, one of the first cores in the first row is switched to the matched state of magnetic remanence.

Thereafter, the column driver **15*x* is again energized to provide a subsequent current designated $+I_R$. This current is of sufficient magnitude to drive the core $C_1$ to its mismatched state of magnetic remanence and induce a current in line 21a which is large enough to destroy the data stored in word 21. However, as such data is being destroyed, it is sensed by sense amplifiers 22a, 23a and 24a which are connected to lines 22, 23 and 24 respectively. These amplifiers sense the currents induced in the lines, as the data previously stored in word 21 is destroyed by the current induced in line 21a**.

After reading out word 21, the control stage 16 again energizes the driver 14y and another column driver which is associated with a column register previously driven to its set state. The column driver subsequently energizes a first core of a pair of cores in the same row in order to drive it between its states of magnetic remanence in order to induce a destructive readout current in the word with which it is associated so that the data thereof can be read out.

This operation continues until all the matched words in the computer memory which are associated with pairs of cores in the same row which have previously been found to be in their matched state (after the search operation) are read out. Thereafter, the row select circuit 14z senses a subsequent row in which pairs of cores in the matched state are found so that the content of the words associated therewith may be sequentially read out. Thus, at the end of the operation, only the words which matched the address word are addressed so that the data content thereof be read out.

Figure 3:
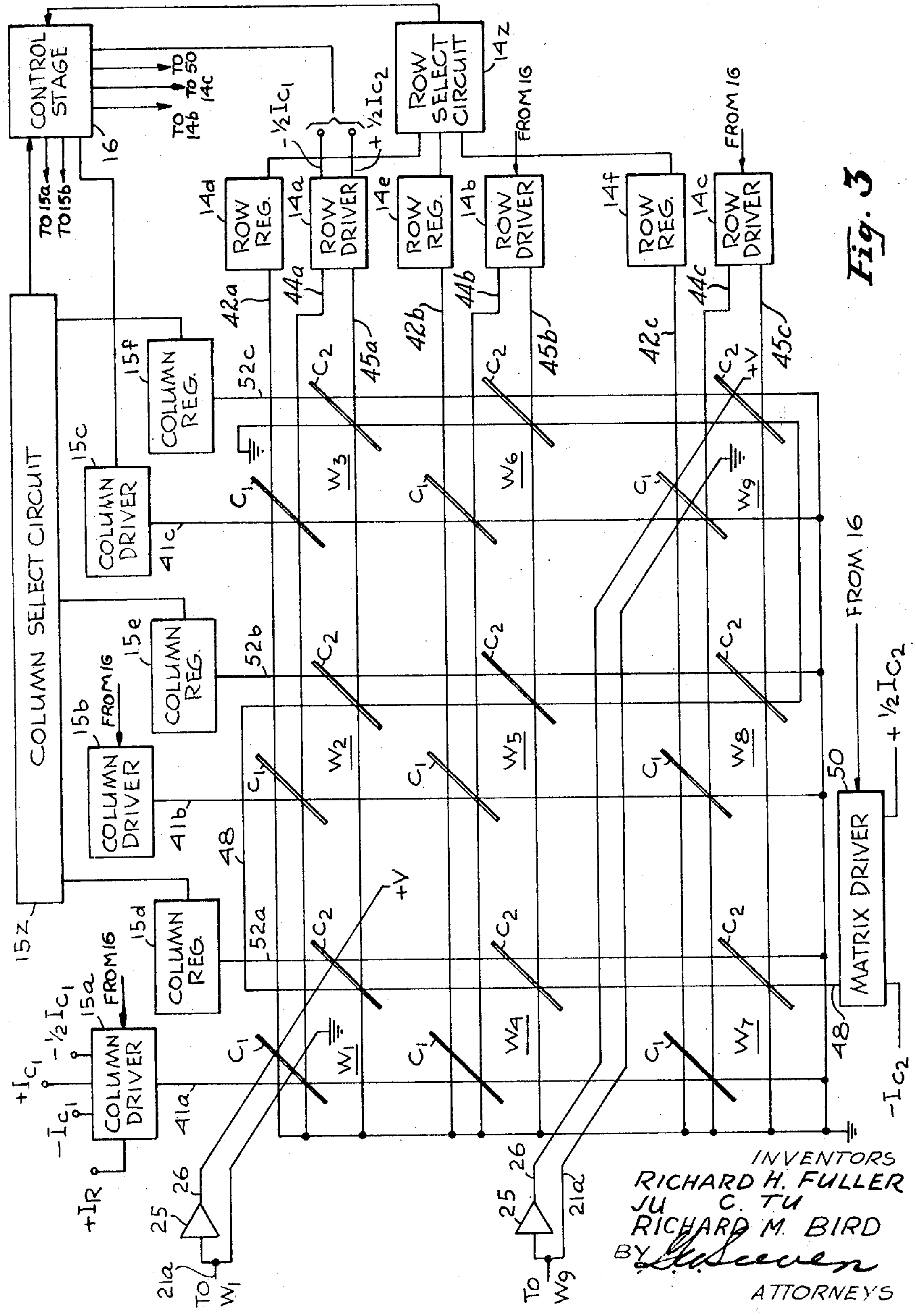
FIGURE 3 is a circuit and schematic block diagram of part of the circuitry shown in FIGURE 1.

For a better understanding of the present invention, reference is now made to FIGURE 3 which is a block diagram of the two-dimensional magnetic core circuit 13, shown comprising a three-by-three matrix of pairs of cores $C_1$ and $C_2$. Let us assume that the computer memory 11 (FIGURE 1) stores nine words, each connected to another pair of cores designated $W_1$ through $W_9$ respectively. Hereafter, the designation $W_1$ through $W_9$ will be used to designate either the pairs of cores in circuit 13 or the words stored in the memory 11 which are coupled to the pairs of cores.

Prior to the search operation, column drivers 15a, 15b and 15c, each being identical with register 15x (FIGURE 2), provide a current $-I_{C_1}$ in windings 41a, 41b and 41c threaded through the $C_1$ cores in the three columns. The function of the current is to set the $C_1$ cores to their matched state, hereafter also referred to as the clear state of magnetic remanence. Also, matrix driver 50 provides a current $-I_{C_2}$ in winding 48 which drives all the $C_2$ cores to their clear state. Column register 15d, 15e 15f associated with the three column and row registers 14d, 14e and 15f associated with the three rows, may be bistable circuits, such as flip-flops, which are driven to their reset state prior to the search operation.

Thereafter, the search operation is conducted during which each of the nine words in the memory 11 is compared with the address word in the circuitry 12. Let us assume that the search or comparison cirterion is to select only the words which match the address word. Consequently, the latching sense amplifier 25 associated with each word is operated to latch only if a pulse is provided on line 21a which indicates that the stored word does not match the address word. Then reference potential such as +V is pulsed to provide signals in winding 26, coupled to latched amplifiers in order to drive all the $C_1$ and $C_2$ cores associated with mismatched words to their mismatched state of magnetic remanence, hereafter also referred to as the set state. In order to simplify FIGURE 3, only the sense amplifiers 25 and windings intercoupling words $W_1$ and $W_9$ to the pairs of cores are shown.

Let it be assumed that only words $W_1$, $W_7$ and $W_9$ match the address word in the address amplifier. Then from the foregoing, it should be appreciated that at the end of the search operation, only the $C_1$ and $C_2$ cores in pairs $W_1$, $W_7$ and $W_9$ remain in the clear state of magnetic remanence while all other cores are driven to their set state.

After the search operation, the column drivers 15a, 15b and 15c drive the $C_1$ cores to their set state with current pulses $+I_{C1}$. The $C_1$ cores of pairs $W_1$, $W_7$ and $W_9$ are driven to their set state, inducing current pulses in windings 42a and 42c, which switch registers 14d and 14f to their set states. Since the $C_1$ cores in the second row were in the set state prior to the supply of the current pulses $+I_{C_1}$, these pulses do not affect the cores. Consequently, a current is not induced in winding 42b so that register 14e remains in its reset state. This indicates that none of the pairs of cores in the second row is associated with a matched word in the memory.

Thereafter, the row select circuit 14z senses the first row register which is in a set state. In the present example, this will be register 14d associated with the first row in which pair $W_1$ is located. The row driver 14a associated with the first row and driver 50 are energized to provide currents designated $+\frac{1}{2}I_{C_2}$ in windings 45a and 48. The function of these coincident currents is to drive the $C_2$ cores in the first row to their set state. Since only $C_2$ of pair $W_1$ is not yet in this state, it will switch to the set state, inducing a pulse in winding 52a which switches column register 15d to the set state. Column registers 15e and 15f remain in their reset state, since cores $C_2$ of pairs $W_2$ and $W_3$ are unaffected by the current from driver 14a.

During this state of operation, all the cores in the first row are in their set state of magnetic remanence. However, registers 15d and 14d are set, indicating that the pair $W_1$ is associated with a matched word in the computer memory. During the next step, the control stage 16 activates driver 14a to provide a current $-\frac{1}{2}I_{C_1}$ in winding 44a. Coincidently, driver 15a is activated to provide an identical $(-\frac{1}{2}I_{C_1})$ current in winding 41a. The two coincident currents switch core $C_1$ of pair $W_1$ to a clear state of magnetic remanence. A subsequent $+I_R$ current of sufficient magnitude is provided by driver 15a in winding 41a in order to return core $C_1$ of pair $W_1$ to its set state. This induces a current in winding 21a connected to the word $W^1$ in the memory. The induced current is of sufficient magnitude to alter or destroy the data stored in the word $W_1$. While the data is altered or destroyed, known destructive readout techniques can be employed to read out the content thereof. Thus the first ($W_1$) matched word is read out.

Thereafter, the column select circuit 15z searches for another column register in a set state. But since both registers 15e and 15f are assumed to be in a reset state (pairs $W_2$ and $W_3$ being associated with mismatched words), none are found. The control stage 16 then energizes row select circuit 14z to find the next row register in a set state, which in the present example is register 14f. Drivers 14c and 50 are activated to provide currents $+\frac{1}{2}I_{C2}$ in windings 45c and 48, which set the $C_2$ cores of pairs $W_7$ and $W_9$. These cores induce currents in windings 52a and 52c which set column registers 15d and 15f, indicating that the cores in the third row and first and third columns are associated with matched words in the memory. The column select circuit 15z senses the first set column register (15d), so that during the subsequent step, coincident currents $(-\frac{1}{2}I_{C_1})$ are provided by drivers 15a and 14c in windings 41a and 44c respectively to clear core $C^1$ of pair $W_7$. After being cleared, the same core is set by a $+I_R$ current from driver 15a induced in winding 41a. While being driven to the set state, $C_1$ of pair $W_7$ induces a current in winding 21a connected to word $W_7$ in the memory so that the content thereof can be destructively read out.

Thereafter, the column select circuit 15z senses the next column register in a set state, which in the present example is register 15f. Thus, during the next cycle, drivers 15c and 14c induce $\frac{1}{2}-I_{C_1}$ currents in windings 41c and 44c respectively, in order to clear core $C_1$ of pair $W_9$. Then the same core is set by a $+I_R$ current in winding 41*c* from driver 15*c*, and as a result thereof induced a current in winding 21*a* coupling it to the word $W_9$ in the memory. Thus word $W_9$ can be destructively read out.

From the foregoing, it is thus seen that the novel circuit of the present invention is operated so that only the words in a memory which compare with an address word in accordance with a predetermined comparison criterion can be sequentially located or addressed in order to sequentially read out the data content thereof. In the foregoing description, the comparison criterion has been a match between an address word and the words in the memory so that only matched words are sequentially read out. It is apparent however, that other comparison criteria may be used to select any one or a group of words out of the plurality of words in the memory for sequential addressing and/or readout. What is necessary according to the teachings of the invention is that at the end of the search operation (regardless of the comparison criterion) all the pairs of cores of the words which are not to be read out or addressed be driven to their set state of magnetic remanence, while the cores associated with the group of words to be addressed or read out, be in a clear state of magnetic remanence. Thereafter, the operation of sequentially locating and reading out the data contained in the selected group of words continues as herebefore described.

The complete sequence of operating the novel circuit of the invention may be summarized in conjunction with FIGURE 3 as follows:

*Step 1.*—Drive column drivers (15*a*, 15*b* and 15*c*) to induce $-I_{C_1}$ currents to clear all $C_1$ cores. Also, drive matrix driver 50 to provide $-I_{C_2}$ current in winding 48 to clear all $C_2$ cores.

*Step 2.*—Search the memory and latch all the sensing amplifiers (25) of the words which are not to be read out.

*Step 3.*—Provide pulses via reference potential $+V$ to drive all the cores associated with latched amplifiers i.e. words which are not to be read out to their set state of magnetic remanence.

*Step 4.*—Switch all column registers to their reset state.

*Step 5.*—Drive column drivers to provide $+I_{C_1}$ current to set $C_1$ of pairs associated with selected words and to set the row registers coupled to such $C_1$ cores.

*Step 6.*—Turn on row select circuit to select first row register in set state and switch all column registers to reset state.

*Step 7.*—Send $\frac{1}{2}I_{C_2}$ currents by matrix driver 50 and set row driver to drive all $C_2$ cores of selected pairs and set corresponding column registers.

*Step 8.*—Energize column select circuit to select first column register in set state.

*Step 9.*—Send $-\frac{1}{2}I_{C_1}$ currents by selected row driver and column driver to clear the $C_1$ core associated with a selected word.

*Step 10.*—Send $+I_R$ current by selected column driver to drive $C_1$ core to set state and induce destructive readout current in selected stored word.

*Step 11.*—Repeat steps 8 through 10 for each set column register in a selected row.

*Step 12.*—Repeat steps 6 through 11 for each row register until all selected words are sequentially read out.

There has accordingly been shown and described herein a novel logic circuit utilizing magnetic cores for sensing words selected out of a plurality of words stored in a computer memory in accordance with a predetermined comparison criterion, and for sequentially energizing only the selected words so that they may be read out. It is appreciated that those familiar with the art may make modifications in the arrangements as shown without departing from the true spirit of the invention. For example, instead of sequentially reading out the matched words, the magnetic cores of the novel circuit hereinbefore described may be sequentially interrogated to provide a series of sequentially generated signals which indicate the locations of all the matched words with the location sequence of all the words stored in the memory. Therefore, all such modifications and equivalents are deemed to fall within the scope of the invention as claimed in the appended claims.

What is claimed is:

1. In a computer memory system of the type including a plurality of stored words containing data, and means for comparing said stored words with an input word to sense a group of words each of which compares with said input word in accordance with a predetermined criterion, an improved circuit for sequentially activating said group of words to read out the data thereof comprising:

a plurality of magnetic core means arranged in a two-dimensional matrix of rows and columns, each having two states of magnetic remanence and drivable therebetween;

means for coupling each of said magnetic core means to another of said stored words;

means for driving the magnetic core means coupled to each of the words which compares with said input word in accordance with said predetermined criterion to a first state of magnetic remanence and for driving the magnetic core means coupled to each of the stored words which does not compare with said input word to a second state of magnetic remanence;

means for sequentially sensing the magnetic core means on said first state of magnetic remanence; and means for sequentially driving said magnetic core means in said first state to said second state for sequentially activating said group of words to read out the date thereof, said means for sequentially driving including row means, column means, and control means for energizing said row and column means for sequentially sensing the locations of said magnetic core means in said first state of magnetic remanence in said two-dimensional matrix, each of said magnetic core means comprises first and second magnetic cores, inductively coupled to said row means, column means and one of said stored words, control means for energizing said column means to drive the first core of each magnetic core means in said first state to the second state of magnetic remanence to energize said row means to sense the rows in which are located magnetic core means in said first state which are coupled to one of the words in said group of words which compare with said input word, and said control means for energizing said row means to drive the second cores of magnetic core means in said first state in a selected row to their second state of magnetic remanence to energize said column means to sense the columns in which magnetic core means in said first state in said selected row are located.

2. A circuit for sensing the locations of data words selected from a plurality of data words stored in a memory in a predetermined location sequence, said data words being selected in accordance with a predetermined comparison criterion with a reference data word comprising:

a plurality of pairs of magnetic cores arranged in a two-dimensional matrix of rows and columns, each pair of magnetic cores comprising first and second cores of magnetic material each core having two stable states of magnetic remanence and drivable therebetween;

means for coupling each pair of cores to another of said plurality of data words whereby the location of each pair in said matrix is related to the location of the data word in said location sequence for driving the cores of the pairs coupled to said selected data words to a first state of magnetic remanence and for driving the cores of the pairs coupled to the rest of said data words in said location sequence to a second state of magnetic remanence;

row means coupled to the first and second cores of each pair of magnetic cores;

column means coupled to the first and second cores of each pair of magnetic cores;

control means including means for energizing said column means to drive the first cores of the pairs coupled to the selected data words to the second state of magnetic remanence for activating said row means to select the rows wherein are located pairs of cores coupled to said selected data words.

3. A circuit as recited in claim 2 wherein said row means include a plurality of row registers and row drivers, each row register being coupled to the first cores of each pair of cores in another row, and each row driver being coupled to at least the second cores of each pair of cores in another row, said column means including a plurality of column registers and column drivers, each column register being coupled to the second cores of each pair of cores in another column and each column driver being coupled to the first cores of each pair of cores in another column said row means further including row select means coupled to said row registers, said row drivers being coupled to said control means, said column means further including column select means coupled to said column registers.

4. A circuit as recited in claim 3 including means for coupling each row driver to the first cores of all the pairs of cores in another row, said control means further including means for energizing the row driver of a selected row and the column driver of a selected column to drive the first core of the pair of cross located at said selected row and column between its stable states of magnetic remanence to induce a signal in the means coupling said core and one of the selected data words in said memory.

5. In combination with an associative memory system comprising a memory unit for storing $N^2$ data words in $N^2$ locations arranged in a sequence, means for comparing each of the stored words with an input word to select stored words which compare with said input word in accordance with a predetermined criterion a circuit comprising:

- $N^2$ pairs of magnetic cores arranged in a matrix of N columns and N rows, each pair comprising first and second cores, each core being of magnetic material having two states of magnetic remanence and drivable therebetween;
- means for coupling each pair of cores in said matrix to another of said $N^2$ data words, whereby the location of each pair of cores in said matrix corresponds to the location of the data word to which it is coupled in said sequence;
- N row registers, each register having two stable states;
- N column drivers;
- means for coupling the first core in each pair in each row to another of said N row registers and for coupling the first cores in each pair in each column to another of said N column drivers;
- N row drivers;
- N column registers each register having two stable states;
- a matrix driver;
- means for coupling the second core in each pair of cores in each row to another of said N drivers, including means for coupling the second core in each pair of cores in each column to another of said N registers, and for coupling the second core in each pair of cores in said matrix to said matrix driver;
- means for driving each core in said pairs of cores to a first state of magnetic remanence;
- means for driving the pairs of cores coupled to data words which do not compare with said input word in accordance with said predetermined criterion to a second state of magnetic remanence and for maintaining the pairs of cores coupled to said selected data words in said first state of magnetic remanence;
- control means coupled to said N column drivers for driving the first cores of said pairs of cores coupled to said selected words to said second state of magnetic remanence, to drive the row registers coupled to the first cores to a set state;
- row select means coupled to said control means and to said N row registers for sensing the row registers in said set state, said control means including means coupled to said N row drivers and said matrix driver for driving the second core of each pair of cores coupled to a selected word in another of said rows selected by said row select means as a function of the set state of the row register associated therewith to drive selected column registers to their set state; and
- column select means coupled to said control means and each of said column registers for sensing the column registers driven to their set state.

6. In combination with an associative memory system a circuit as recited in claim 5 further including means for coupling the first core of each pair of cores in each row to another of said row drivers, said control means further including means responsive to said row and column control means for sequentially driving a selected row driver and selected column driver to drive the first core of the pair of cores located thereat so as to provide a signal indicative of the location thereof.

References Cited

UNITED STATES PATENTS 3,257,650 6/1966 Koerner ............ 340—174

JAMES W. MOFFITT, *Primary Examiner.*

U.S. Cl. X.R.

340—146.2